United States Patent [19]
Krogsrud

[11] 3,779,510
[45] Dec. 18, 1973

[54] ROTATABLE GASTIGHT VALVE

[75] Inventor: Harald Krogsrud, Gjettum, Norway

[73] Assignee: Elkem A/S, Oslo, Norway

[22] Filed: Aug. 1, 1972

[21] Appl. No.: 277,129

[52] U.S. Cl..................... 251/301, 266/31, 251/304
[51] Int. Cl......... F16k 5/00, F16k 1/16, C21b 7/08
[58] Field of Search................... 251/301, 298, 291, 251/304, 314; 266/31

[56] References Cited
UNITED STATES PATENTS

| | | | |
|---|---|---|---|
| 384,849 | 6/1888 | Hood | 251/304 |
| 955,600 | 4/1910 | Levey | 251/301 X |
| 1,404,028 | 1/1922 | Jones | 251/301 X |
| 1,951,121 | 3/1934 | Babcock | 251/304 X |

*Primary Examiner*—Samuel Scott
*Assistant Examiner*—Ira S. Lazarus
*Attorney*—William D. Lucas

[57] ABSTRACT

A rotatable valve for gas pipes is disclosed. The valve comprises a disc having an aperture therein, the diameter of the aperature being located entirely within a radius of the disc.

6 Claims, 2 Drawing Figures

PATENTED DEC 18 1973　　　　　　　　　　　　　　　3,779,510

ROTATABLE GASTIGHT VALVE

The present invention relates to a new and useful rotatable valve to be used in connection with gas outlets, especially those used in connection with electric smelting furnaces.

Today, the majority of metallurgical smelting and reduction processes are carried out in so-called covered smelting furnaces which are equipped with a furnace vault. In order to prevent environmental pollution, the furnace unit will usually be equipped with a gas cleaning plant to clean flue gases and larger units will frequently be equipped with two gas cleaning plants which are connected to separate outlets from the furnace. If a gas cleaning plant has to be shut down for one reason or another, it is necessary to completely shut off the outlet to that gas cleaning plant.

Under present practice, a telescopic part of the exhaust pipe is raised whereupon the gas outlet from the furnace can be closed by means of cover. Sand or a similar material capable of withstanding the high temperatures of smelting furnaces is usually used as a gas sealing material between the gas pipe and the cover.

Where the furnace unit has a single gas cleaning plant which has to be stopped, it is necessary to shut off the gases to that gas cleaning plant and open a gas pipe directly to the atmosphere. The gas pipe directly to the atmosphere is normally in the closed position when the gas cleaning plant is in operation. When the gas cleaning plant can again be returned to operation, it is necessary to close the direct outlet to the air and again open the outlet to the cleaning plant. Similarly where two or more gas cleaning plants are used for one furnace, if one is shut down, it is necessary to shut off the flow of gas to this plant and, if the other plant is only being used as an alternative, it is necessary to open the gas pipe to this plant.

The waste gases from smelting furnaces are heavily loaded with dust and have a temperature of about 400°– 600°. It will thus be readily appreciated that raising a telescopic part of the gas system and applying a cover by hand is both laborious and difficult.

There has now been discovered a gas valve which can be automatically activated to open or close a smelting furnace gas pipe or which, alternatively, can be readily and easily operated by hand. The valve comprises a circular disc which has an aperture therein with a diameter less than the radius of the circular disc but located entirely within the radius i.e., on one side of the center of the disc. The aperture in the circular disc is aligned in the gas pipe to permit the flow of gas in the open position and is disposed outside of the gas pipe when the valve is in the closed position. In the preferred embodiment of the invention, the aperture is enclosed in a container of sand or other sealing material when it is in the closed position.

These and other features of the present invention may be more fully understood with respect to the drawings in which like numbers refer to like parts and in which.

Figure 1:
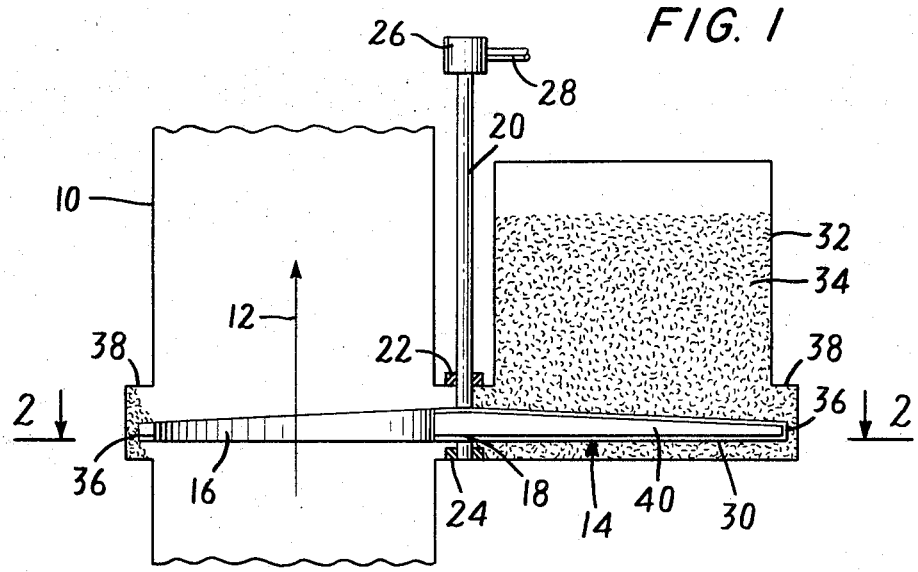
FIG. 1 is a side view of the preferred embodiment of the present invention.
Figure 2:
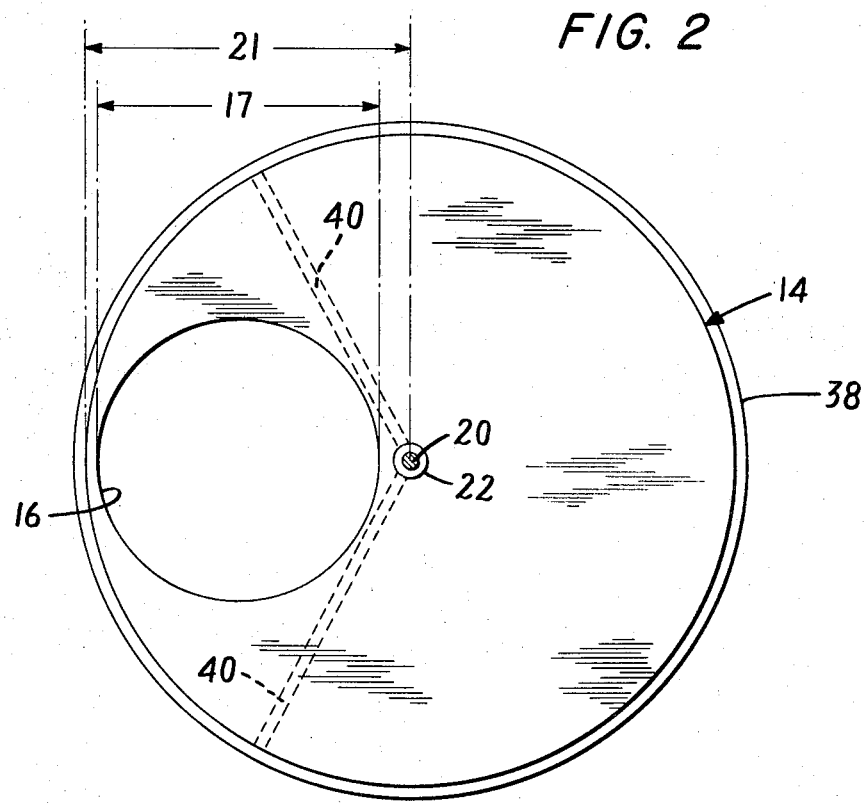
FIG. 2 is a top view of the embodiment of FIG. 1 through line 2—2.

Referring to the Figures, there is seen a gas pipe 10 with gas flowing in the direction of the arrow 12 from a smelting furnace (not shown) located below pipe 10.

Within the pipe is a valve disc 14 having therein a aperture 16 through which the gases from the smelting furnace can pass. The center of the rotatable disc is shown at 18, and, as can be seen, the diameter 17 of the aperture 16 is less than the radius 21 of the rotatable disc 14 and located entirely within the radius. The rotatable disc is supported on shaft 20 which is sealed from the disc and held in position by sealing members 22 and 24. On the top of the shaft 20 can be provided a gear box 26 with shaft 28 going to automatic control means (not shown) or shaft 20 can be connected to a handle for hand rotation or the like. In the present invention, it is preferred that shaft 20 be rotated by automatic control means.

The side of the rotatable disc 30 away from the gas pipe is preferably disposed in a container 32 which is filled with sand or other suitable sealing material 34 depending upon the application. The perimeter 36 of the rotatable disc is disposed in groove 38 for gastight sealing. On the bottom of the rotatable disc are preferably provided one or more scrapers 40.

In the position shown, the valve is open. When it is desired to close the valve, the disc 14 is rotated by shaft 20 so that the aperture 16 is within the container 32, which is an 180° rotation from the open position. Because of the sloped position of the top of the disc, as it is rotated, sand on the top of the disc will be distributed throughout the groove 38 and will thus form a sealing engagement between the end of the disc 36 and the groove 38. When it is desired to again open the valve, the valve is rotated 180° to return the aperture in the rotatable disc to the gas pipe.

Because of the high temperatures of smelting furnaces, the sand or other sealing materials will usually become sintered and because of the nature of the gases they will become dust-loaded. This can markedly decrease the efficiency of the seal. In order to overcome this, the rotatable disc is preferably provided with one or more scrapers 40 which will "clean" the valve each time it is rotated by moving the sealing material in the bottom of the container out into the gas pipe 12 from which it will fall into the furnace and be consumed. Fresh sealing material will thus be supplied to the valve disc each time it is rotated.

While the invention has been described with, and has particular application to, smelting furnaces, it will be understood that there are other applications to which the valve can readily be put. It will therefore be understood that the claims are intended to cover all changes and modifications of the preferred embodiment of the invention which has been chosen for the purpose of illustration.

What is claimed is:

1. In an apparatus comprising an electric smelting furnace, a gas cleaning plant and a gas pipe connecting the electric smelting furnace to the gas cleaning plant, the improvement which comprises a gastight rotatable valve located on a vertical section of said gas pipe, said valve comprising in combination a circular disc with an aperture therein, the diameter of the aperture being substantially equal to the diameter of the gas pipe and the diameter of the aperture being located entirely within a radius of the disc, at least a portion of the disc being enclosed within a container, a sealing material within the container, and scrapers on the disc whereby rotation of the disc causes a portion of the sealing material to fall into the gas pipe and hence to the smelting furnace.

2. In an apparatus comprising an electric smelting furnace, a gas cleaning plant and a gas pipe connecting the electric smelting furnace to the gas cleaning plant, the improvement which comprises a gastight rotatable valve located on a vertical section of said gas pipe, said valve comprising in combination a circular disc with an aperture therein, the diameter of the aperture being substantially equal to the diameter of the gas pipe and the diameter of the aperture being located entirely within a radius of the disc, at least a portion of the disc being enclosed within a container, a sealing material within the container, and the sealing material being sand.

3. A gastight rotatable valve for use on a gas pipe said valve comprising in combination a circular disc with an aperture therein, the diameter of the aperture being substantially equal to the diameter of the gas pipe and the diameter of the aperture being located entirely within a radius of the disc, at least a portion of the disc being enclosed within a container, a sealing material within the container, and scrapers on the disc whereby rotation of the disc causes a portion of the sealing material to fall into the gas pipe.

4. A gastight rotatable valve for use on a gas pipe said valve comprising in combination a circular disc with an aperture therein, the diameter of the aperture being substantially equal to the diameter of the gas pipe and the diameter of the aperture being located entirely within a radius of the disc, at least a portion of the disc being enclosed within a container, a sealing material within the container, and the sealing material being sand.

5. In an apparatus comprising an electric smelting furnace, a gas cleaning plant and a gas pipe connecting the electric smelting furnace to the gas cleaning plant, the improvement which comprises a gastight rotatable valve located on a vertical section of said gas pipe, said valve comprising in combination a circular disc with an aperture therein, the diameter of the aperture being substantially equal to the diameter of the gas pipe and the diameter of the aperture being located entirely within a radius of the disc, at least a portion of the disc being enclosed within a container, a sealing material within the container, and the sealing material being granular.

6. A gastight rotatable valve for use on a gas pipe said valve comprising in combination a circular disc with an aperture therein, the diameter of the aperture being substantially equal to the diameter of the gas pipe and the diameter of the aperture being located entirely within a radius of the disc, at least a portion of the disc being enclosed within a container, a sealing material within the container, and the sealing material being granular.

* * * * *